(12) United States Patent
Jammalamadaka et al.

(10) Patent No.: US 10,748,063 B2
(45) Date of Patent: Aug. 18, 2020

(54) NEURONAL NETWORK TOPOLOGY FOR COMPUTING CONDITIONAL PROBABILITIES

(71) Applicant: HRL Laboratories, LLC, Malibu, CA (US)

(72) Inventors: Aruna Jammalamadaka, Agoura Hills, CA (US); Nigel D. Stepp, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/294,815

(22) Filed: Mar. 6, 2019

(65) Prior Publication Data

US 2019/0318241 A1 Oct. 17, 2019

Related U.S. Application Data

(60) Provisional application No. 62/659,085, filed on Apr. 17, 2018.

(51) Int. Cl.
*G06N 3/08* (2006.01)
*G06N 3/063* (2006.01)
*G06N 7/00* (2006.01)
*G08G 9/02* (2006.01)

(52) U.S. Cl.
CPC ............. *G06N 3/08* (2013.01); *G06N 3/063* (2013.01); *G06N 7/005* (2013.01); *G08G 9/02* (2013.01)

(58) Field of Classification Search
None
See application file for complete search history.

(56) References Cited

U.S. PATENT DOCUMENTS

| 9,218,563 | B2 | 12/2015 | Szatmary et al. |
| 2015/0074026 | A1 | 3/2015 | Szatmary et al. |
| 2018/0075345 | A1 | 3/2018 | Gottfried et al. |

OTHER PUBLICATIONS

A. Sarajedini, R. Hecht-Nielsen, and P. Chau, "Conditional probability density function estimation with sigmoidal neural networks", IEEE Trans. on Neural Networks. vol. 10, No. 2, Mar. 1999, pp. 231-238. (Year: 1999).*

(Continued)

*Primary Examiner* — Vincent Gonzales
(74) *Attorney, Agent, or Firm* — Tope-McKay & Associates

(57) ABSTRACT

Described is a system for estimating conditional probabilities for operation of a mobile device. Input data streams from first and second mobile device sensors are input into a neuronal network, where the first and second input data streams are converted into variable spiking rates of first and second neurons. The system learns a conditional probability between the first and second input data streams. A synaptic weight of interest between the first and second neurons converges to a fixed-point value, where the fixed-point value corresponds to the conditional probability. Based on the conditional probability and a new input data stream, a probability of an event is estimated. Based on the probability of the event, the system causes the mobile device to perform a mobile device operation.

20 Claims, 10 Drawing Sheets

(56) References Cited

OTHER PUBLICATIONS

J. Bill, L. Buesing, S. Habenschuss, B. Nessler, W. Maass, and R. Legenstein. Distributed bayesian computation and self-organized learning in sheets of spiking neurons with local lateral inhibition. PloS one, 10(8):e0134356, 2015, pp. 1-51.

Song et al., "Competitive Hebbian Learning through Spike-Timing-Dependent Synaptic Plasticity" in Nature Neuroscience 3, pp. 919-926.

Notification of Transmittal of International Search Report and the Written Opinion of the International Searching Authority for PCT/US2019/021049; dated Jun. 21, 2019.

International Search Report of the International Searching Authority for PCT/US2019/021049; dated Jun. 21, 2019.

Written Opinion of the International Searching Authority for PCT/US2019/021049; dated Jun. 21, 2019.

Qiuwen Chen et al. 'Real-time anomaly detection for streaming data using burst code on a neurosynaptic processor', Design, Automation & Test in Europe Conference & Exhibition (DATE), 2017.

Subutai Ahmad et al. 'Real-Time Anomaly Detection for Streaming Analytics', arXiv:1607.02480v1, Jul. 8, 2016.

Andrew S. Cassidy et al. 'TrueNorth: a High-Performance, Low-Power Neurosynaptic Processor for Multi-Sensory Perception, Action, and Cognition', Technical Report, IBM ResearchAlmaden Research Center San Jose United States 2016.

* cited by examiner

NEURONAL NETWORK TOPOLOGY FOR COMPUTING CONDITIONAL PROBABILITIES

CROSS-REFERENCE TO RELATED APPLICATIONS

This is a Non-Provisional Application of U.S. Provisional Application No. 62/659,085, filed in the United States on Apr. 17, 2018, entitled, "A Neuronal Network Topology for Computing Conditional Probabilities," the entirety of which is incorporated herein by reference.

BACKGROUND OF INVENTION

(1) Field of Invention

The present invention relates to a system for estimating conditional probabilities and, more particularly, to a system for estimating conditional probabilities using a neuronal network topology.

(2) Description of Related Art

Neuromorphic computation of conditional probabilities aims to replace slow Bayesian updating algorithms with highly parallel, simple computations, by taking inspiration from Spike Timing Dependent Plasticity (STDP), a naturally occurring phenomena of neuronal synapses. STDP results in small increments and decrements of synaptic weights between neurons based on the difference in timing between their spikes.

Current systems often use central processing units (CPUs) or graphic processing units (GPUs) to perform "Bayesian inference" (i.e., estimate parameters of probabilistic models like Bayesian networks given some input data). These inference algorithms involve iterating over conditional distributions of each random variable in the model and often take a long time to converge, making real-time hypothesis and decision-making impossible. A group at Graz University is working on mapping Bayesian inference to synaptic updating as described by Bill et al. in "Distributed Bayesian Computation and Self-Organized Learning in Sheets of Spiking Neurons with Local Lateral Inhibition" in PloS one, 10(8):e0134356, 2015 (hereinafter referred to as the Bill reference), which is hereby incorporated by reference as though fully set forth herein.

The synaptic plasticity rules that are used in the Bill reference are not biologically plausible, instead they are synthetically constructed such that the mapping is easy to perform. As a result, their methodology cannot be implemented on any existing neuromorphic hardware, such as neuromorphic chips. This provides a significant impediment to achieving a hardware realization of their desired spiking properties. Prior art, such as the Bill reference, is only mathematical theory at this point, and would require manufacturing of an entirely new hardware design to move to higher Technical Readiness Levels (TRL).

Thus, a continuing need exists for a system for estimating conditional probabilities for real-time decision making using neuromorphic hardware.

SUMMARY OF INVENTION

The present invention relates to a system for estimating conditional probabilities and, more particularly, to a system for estimating conditional probabilities using a neuronal network topology. The system comprises one or more processors and a non-transitory computer-readable medium having executable instructions encoded thereon such that when executed, the one or more processors perform multiple operations. The system inputs a first input data stream obtained from a first mobile device sensor and a second input data stream obtained from a second mobile device sensor into a neuronal network comprising a plurality of neurons, wherein the first and second input data streams are converted into variable spiking rates of a first neuron and a second neuron. A conditional probability is learned between the first input data stream and the second input data stream, wherein a synaptic weight of interest between the first neuron and the second neuron converges to a fixed-point value corresponding to the conditional probability. Based on the conditional probability and a new input data stream, a probability of an event is estimated. Based on the probability of the event, the system causes the mobile device to perform a mobile device operation.

In another aspect, the mobile device operation is a collision avoidance maneuver.

In another aspect, the mobile device operation is generation of an alert providing instructions to the mobile device operator.

In another aspect, the synaptic weight of interest is updated each time either of the first and second neurons spike according to spike-timing dependent plasticity (STDP), causing a corresponding update in the conditional probability such that the conditional probability is adapted in real-time.

In another aspect, all synaptic connections between neurons in the neuronal network have a predetermined delay, and wherein all synaptic weights besides the synaptic weight of interest are fixed at a value such that only the synaptic weight of interest is updated according to STDP.

In another aspect, an increment or decrement in the synaptic weight of interest due to spikes in the first neuron causing spikes in the second neuron is set to a constant value that is a multiplier on a change in the synaptic weight of interest.

In another aspect, tonic and phasic inputs are used to stabilize the synaptic weight of interest.

The invention further comprises a neuromorphic hardware chip that performs multiple operations. The neuromorphic hardware chip inputs a first input data stream obtained from a first mobile device sensor and a second input data stream obtained from a second mobile device sensor into a neuronal network comprising a plurality of neurons, wherein the first and second input data streams are converted into variable spiking rates of a first neuron and a second neuron. A conditional probability is learned between the first input data stream and the second input data stream, wherein a synaptic weight of interest between the first neuron and the second neuron converges to a fixed-point value corresponding to the conditional probability. Based on the conditional probability and a new input data stream, a probability of an event is estimated. Based on the probability of the event, the neuromorphic hardware chip causes the mobile device to perform a mobile device operation.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
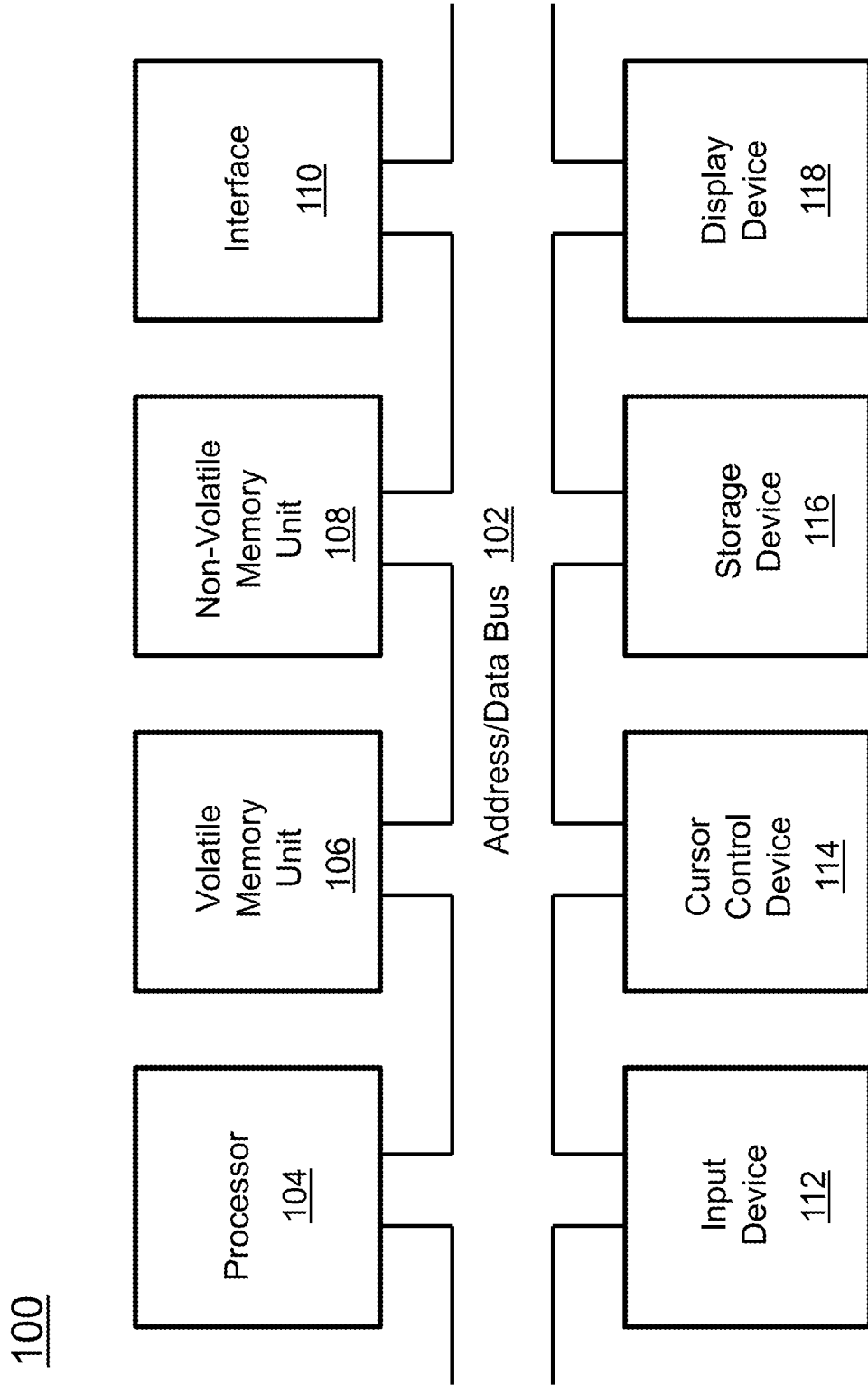
FIG. 1 is a block diagram depicting the components of estimating conditional probabilities according to some embodiments of the present disclosure.

The present invention relates to a system for estimating conditional probabilities and, more particularly, to a system for estimating conditional probabilities using a neuronal network topology. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for estimating conditional probabilities. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
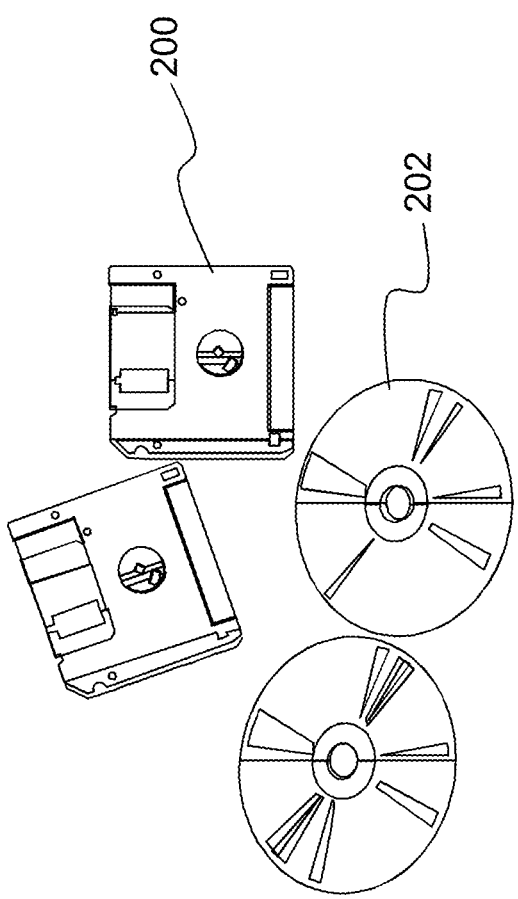
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

Described is a neuronal network (i.e., dealing specifically with neurons) that can operate in two different modes to both learn the joint distribution of variables, and read out conditionals based on partial input (e.g., X without Y, where X and Y are random variables). A conditional probability is a measure of probability that an event will occur given that another event has occurred. A non-limiting example of an event is detection of an object and/or an environmental condition (e.g., road condition, weather) from input data stream obtained from a sensor. Mode 1 learns the conditional probability between two random variables (for example X and Y) by inputting both to the network and allowing the synaptic weight (i.e., strength of connection between two nodes/variables) of interest to converge to P(Y|X). Mode 2 fixes the synaptic weight and allows a user to query the result of, for example, the probability of Y given a new input X. These two modes are also referred to as "learning" and "readout".

This is accomplished by encoding input data streams into spike trains, feeding them into a unique probabilistic computation unit, and letting the synaptic weight of interest converge to a conditional probability. A spike train is a sequence of recorded times (i.e., time series) and which a neuron fires (or spikes) an action potential. The input data streams can be encoded into spike trains using one of many possible methods. For example, one method entails "rate coding", or converting real-valued input data into the variable spiking rates of the input neurons X and Y. The neuronal network described herein leverages a highly parallel and plastic neuromorphic topology to estimate conditional probabilities faster, and can adapt in real-time to time-varying conditional distributions of incoming data by supporting adaptive unsupervised learning. Since the value of the synaptic weight of interest is updated each time the neurons on either side of it spike, the probability P(Y|X) is, therefore, updated as the neuronal spikes come in, in real-time. The operations can be implemented by standard processors or a neuromorphic hardware chip. Neuromorphic chips are modeled on brain features and consist of networks of neurons (e.g., silicon neurons) that communicate in spikes of electricity. Neuromorphic chips are significantly more energy-efficient than conventional chips.

(2.1) Neuronal Dynamics

Figure 3:
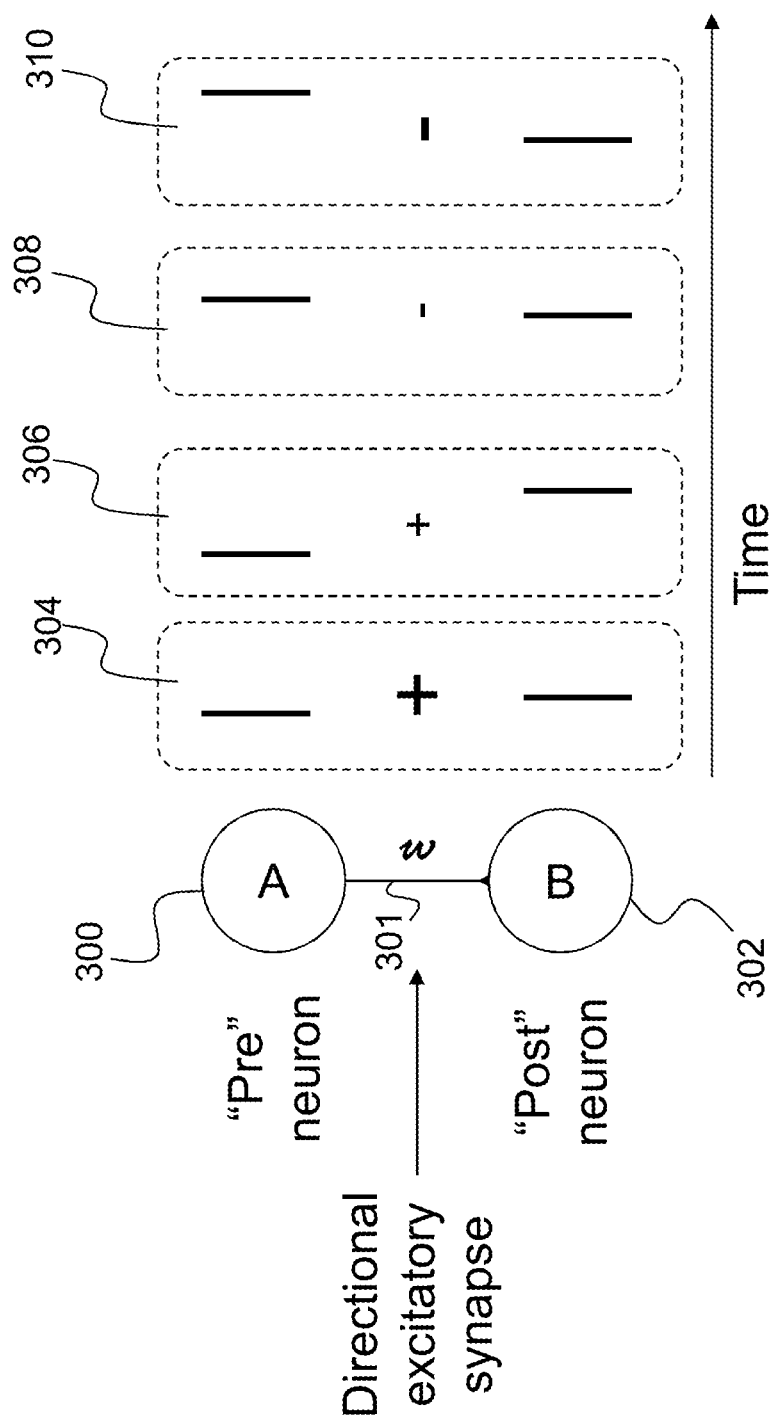
FIG. 3 is an illustration of Spiking Time-Dependent Plasticity (STDP) according to some embodiments of the present disclosure.

Spike-timing-dependent plasticity (STDP) is a biological process that adjusts the strength of connections between neurons in the brain. The process adjusts the connection strengths based on the relative timing of a particular neuron's output and input spikes. STDP results in strengthening connections due to correlated spikes, and weakening connections due to uncorrelated spikes. FIG. 3 is a depiction of STDP. For example, in FIG. 3, if neuron A (element 300) spikes just before neuron B (element 302) then w (element 301) goes up a lot, as represented by element 304. The amount that w increases or decreases is dictated by the parameters (A+, A−, tau+, and tau−) of the STDP curve shown in FIG. 1 and equation (1) in "Competitive Hebbian Learning through Spike-Timing-Dependent Synaptic Plasticity" by Song et al. in Nature Neuroscience 3, 919-926 (hereinafter referred to as the Song reference), which is hereby incorporated by reference as though fully set forth herein. The variable w (element 301) represents the synaptic weight of interest, which models P(Y|X) If neuron A (element 300) spikes a long time before neuron B (element 302) then w goes up a little bit, as represented by element 306. Similarly, if neuron B (element 302) spikes just before neuron A (element 300) then w goes down a lot, as represented by element 308. If neuron B (element 302) spikes a long time before neuron A (element 300) then w goes down a little bit, as represented by element 310.

In this example, neuron B (element 302) has a voltage threshold which, if exceeded, causes it to spike. Spikes from neuron A (element 300) weighted by w accumulate voltage in B (element 302) until this threshold is reached, at which point B (element 302) spikes, w is incremented, and the voltage level is reset to zero. This means that if w=0, ẇ=0, and if w increases ẇ also increases (i.e., there is a monotonic mapping between w and ẇ). Since the likelihood of neuron B (element 302) spiking (and w being incremented (i.e., discrete increase)) is directly proportional to the value of w, write ẇ=w for the instantaneous change in w at time t. The goal is to use these dynamics to create a conditional probabilistic computation unit, which can then be used to model chains of conditional variables (e.g., X→Y→Z) corresponding to larger Bayesian networks.

(2.2) Dynamical Systems

In order to get the synaptic weight w to converge to a probability p, the updates of w have to have a fixed-point at p. This is akin to saying that the goal is a network of neurons that implements a simple dynamical system. A simple fixed-point may be expressed by the dynamical system:

$$\dot{w}=-w, \quad (1)$$

which has a stable fixed-point at w=0. The fixed-point may be shifted by adding a constant term:

$$\dot{w}=-w+p, \quad (2)$$

which has a fixed-point at w=p.

In the plastic neuronal network according to embodiments of the present disclosure, the goal is for the synaptic weight w to converge to a specific value, so it can be thought of as operating under the dynamic expressed in Equation (2) above. The following sections describe a neuronal network topology which achieves convergence to this fixed-point, followed by an explanation of how to use the network to compute p=P(Y|X), and conclude by presenting results on synthetically generated data.

(2.3) Neuronal Network Topology of a Fixed Point System

This section includes a description of the desired network topology for a fixed point dynamical system by breaking it into smaller pieces. Three assumptions are made about the properties of synaptic connections in the following:

1. All synaptic connections in the neuronal network diagrams have a delay of 1, with some of the connections incurring an additional delay indicated by $\tau_i$. This means that in FIG. 4 a spike travels from A (element 300) to B (element 302) in one time unit, and from C (element 400) to A (element 300) in $\tau_i$+1 time units (element 402).
2. All synaptic weights are fixed at 1 besides w, the weight of interest. Therefore, the only weight that updates according to spike-timing dependent plasticity (STDP) (see the Song reference for a detailed description of STDP) is the synapse (or junction) between neurons A and B.
3. The increment or decrement in w due to spikes in A causing spikes in B or vice versa is set to some constant ±α. This value acts as a multiplier on the change in w, i.e., ẇ=αw. However, for this study α=1 and these increments are written simply as ẇ=w without loss of generality.

Figure 4:
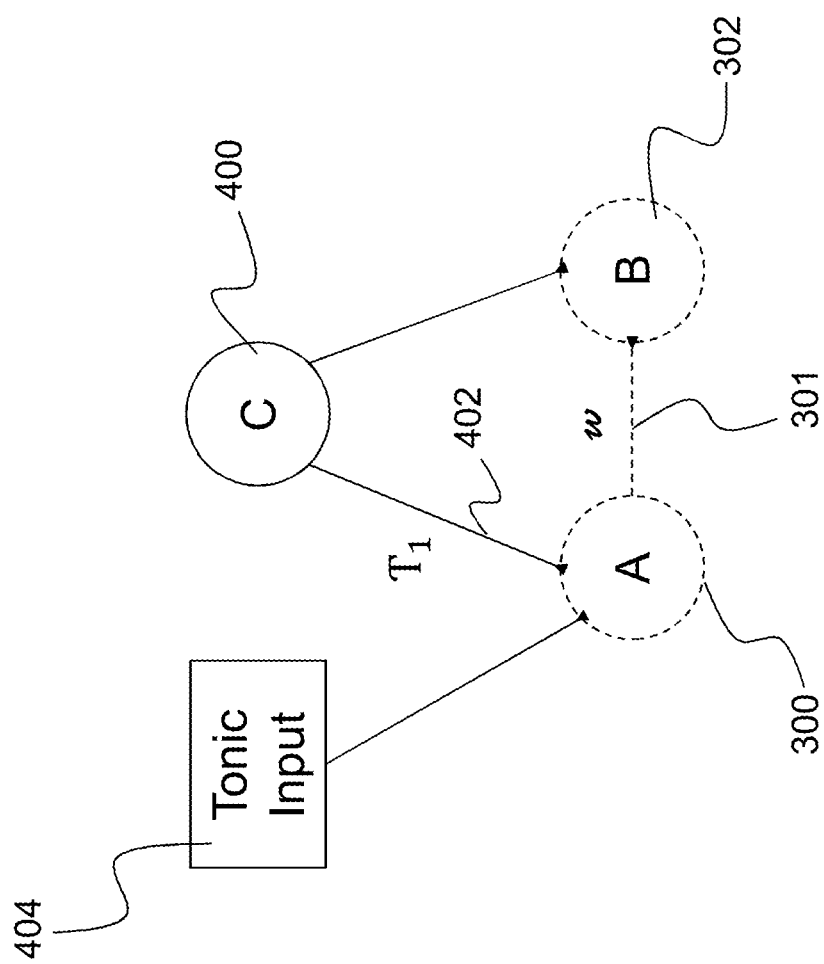
FIG. 4 is an illustration of a three neuron network according to some embodiments of the present disclosure.

FIG. 4 depicts a three-neuron network with the following dynamics for the synaptic weight w. The "Tonic" input $I_T$ (element 404) causes A (element 300) to spike, A (element 300) causes B (element 302) to spike, resulting in an increase to w (element 404). However, if C (element 400) spikes, delay $T_1$ (element 402) will cause B (element 302) to spike before A (element 300), causing w (element 404) to decrease. Additionally, A (element 300) will not cause B (element 302) to spike after $T_1$ (element 402) due to B's (element 302) refractory period, which is the period after stimulation where a neuron is unresponsive. The refractory period of a neuron is a period just after the spikes during which it cannot spike again, even if it receives input spikes from neighboring neurons. This is a known biological mechanism leveraged by the network according to embodiments of the present disclosure. This results in maintenance of a balance, dependent on C (element 400) (i.e., if C (element 400) spikes every time B (element 302) spikes then the α increment from A (element 300) will cancel with that of C (element 400), producing ẇ=0).

Figure 5:
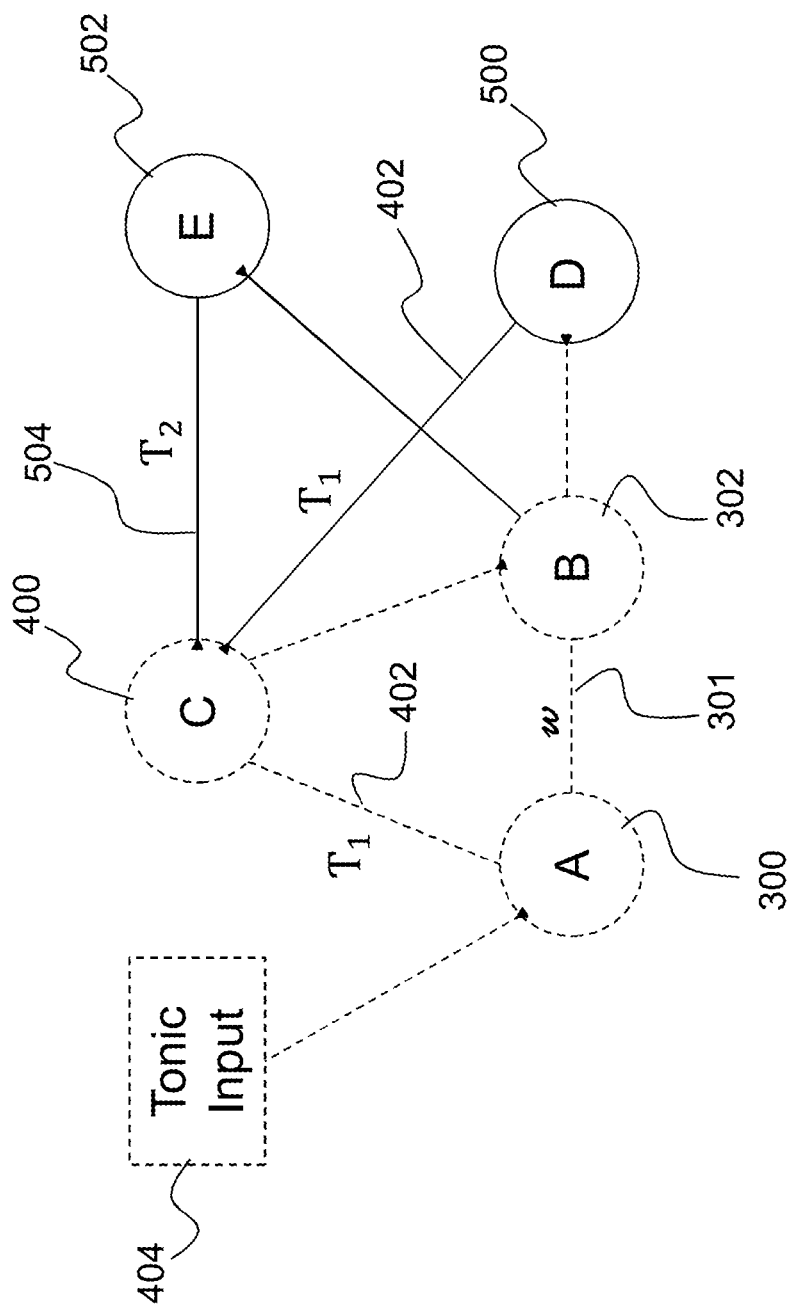
FIG. 5 is an illustration of a five neuron network according to some embodiments of the present disclosure.

FIG. 5 illustrates a five neuron network implementing ẇ=w$I_T$. In FIG. 5, two more neurons D (element 500) and E (element 502) were added, with input from B (element 302) and delays $\tau_1$ (element 402) and $\tau_2$ (element 504), respectively. Since $\tau_1$ (element 402)<$\tau_2$ (element 504), B (element 302) will cause C (element 400) to spike twice: once through D (element 500) (fast path) and once through E (element 502) (slow path). Since the delay $\tau_1$ is less than $\tau_2$, the spikes that travel from B→E→C will take longer than the spikes that travel from B→D→C in FIG. 5, which explains the designation between "fast path" and "slow path". Thus, for each spike from the tonic input $I_T$ (element 404) that causes w (element 301) to increase, there are two spikes coming from C (element 400) that cause it to decrease. As a result, w (element 301) decreases in proportion to itself (i.e., ẇ=w$I_T$−2w$I_T$=−w$I_T$).

Figure 6:
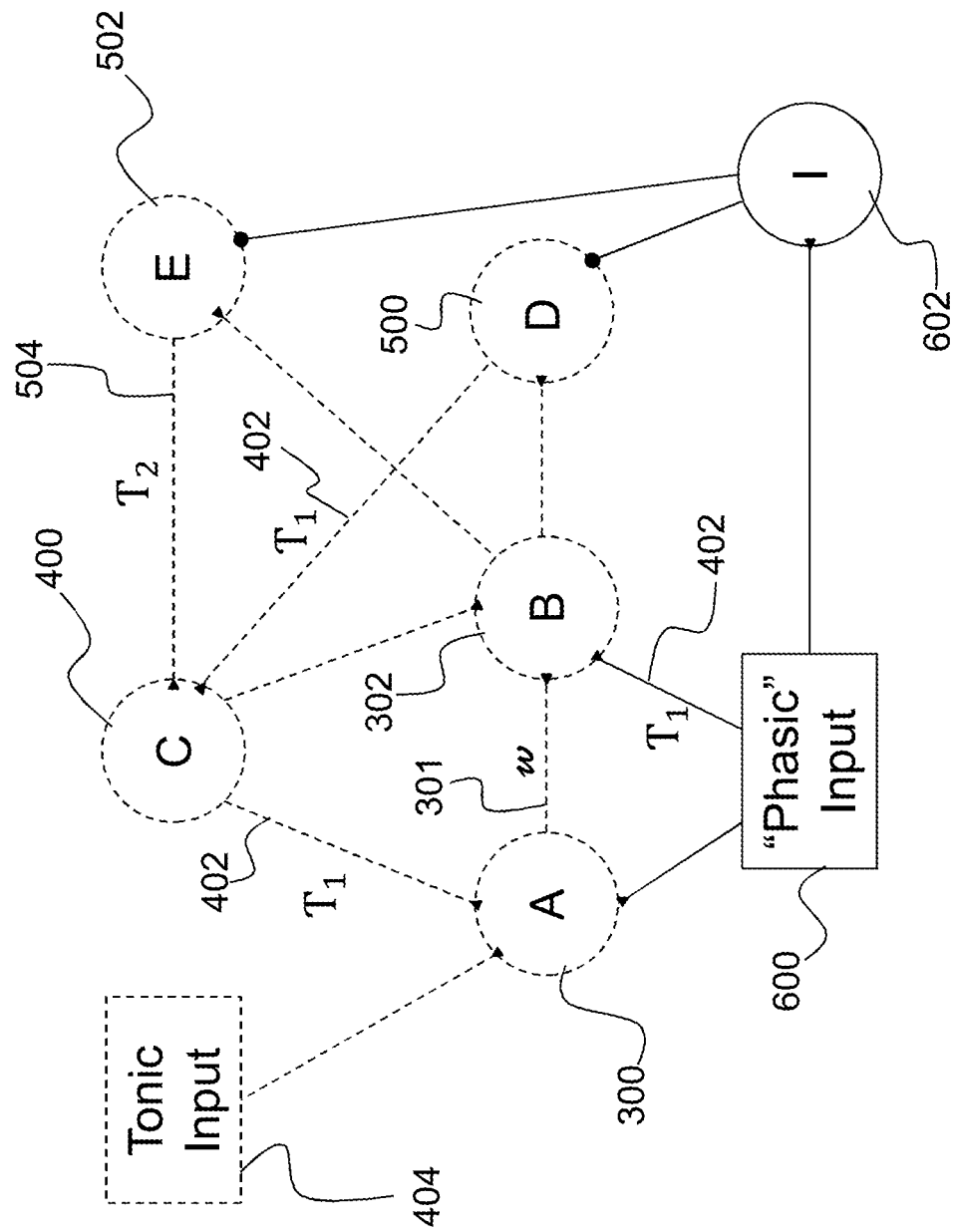
FIG. 6 is an illustration of a six neuron network according to some embodiments of the present disclosure.

In FIG. 6, a "Phasic" input $I_P$ (element 600) is added, which has the reverse effect of neuron C (element 400), increasing w (element 301) every time it spikes (i.e., $\dot{w}=I_P$). The additional neuron I (element 602) inhibits neurons D (element 500) and E (element 502) so that they will not spike with $I_P$ (element 600), and there will be no associated decrease in w (element 301). Note that if B (element 302) spikes as a result of $I_P$ (element 600) it will not spike again due to $I_T$ (element 404) because of B's (element 302) refractory period. This network now models the fixed point: $\dot{w}=-wI_T+I_P$.

Figure 7:
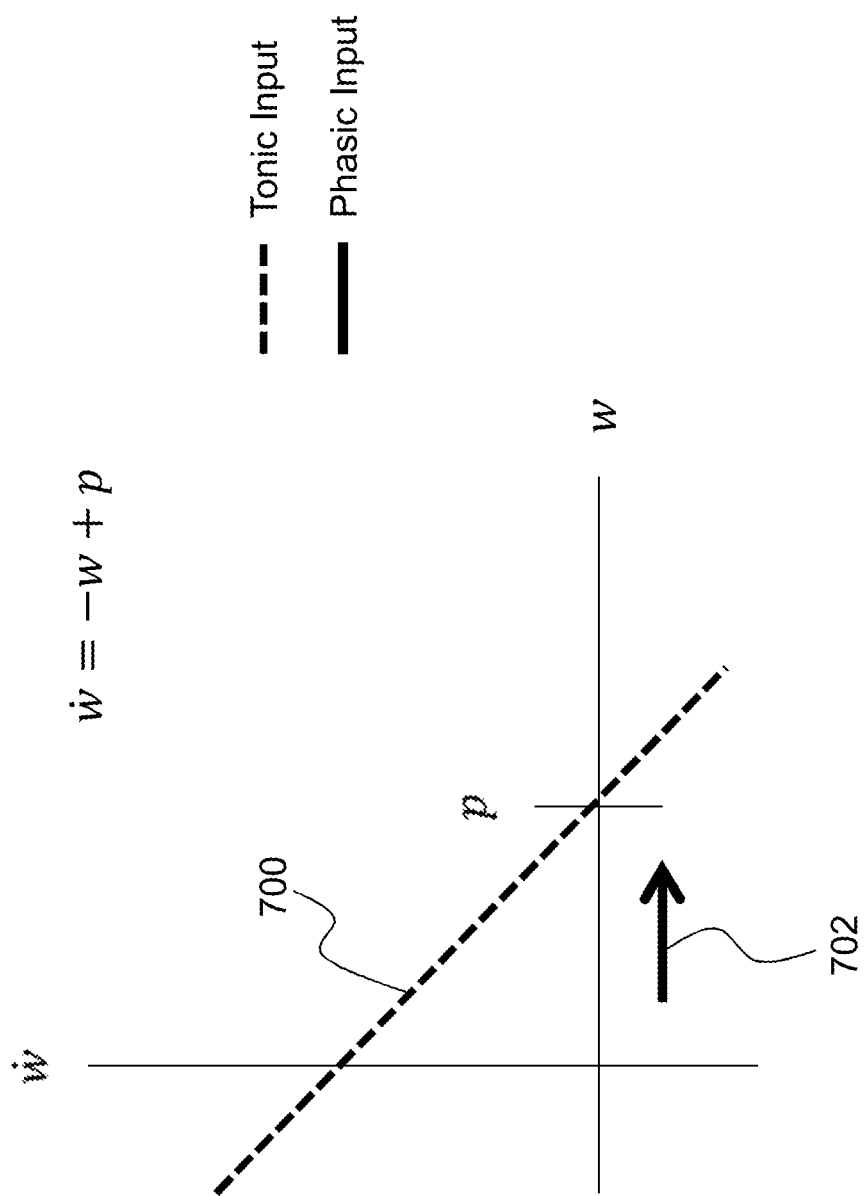
FIG. 7 is an illustration of the effects of tonic and phasic inputs on the convergence of a synaptic weight of interest according to some embodiments of the present disclosure.

FIG. 7 shows how the "Tonic" and "Phasic" inputs $I_P$ and $I_T$ are used to stabilize w. The Tonic input controls the slope of convergence (represented by the dashed line 700), and the Phasic input controls the location of the convergence point p (represented by the arrow 702). In summary, this unique network topology uses a combination of exponential decays and constant growth terms, where $\dot{w}=-wI_T$ corresponds to an exponential decay of the weight w, and $\dot{w}=I_P$ corresponds to a constant growth of the weight w, to achieve a stable fixed-point p at a location that is controlled.

(2.4) Computing Conditional Probability

The network described above models the following differential equation:

$$\dot{w}=-wI_T+I_P. \qquad (3)$$

Figure 8:
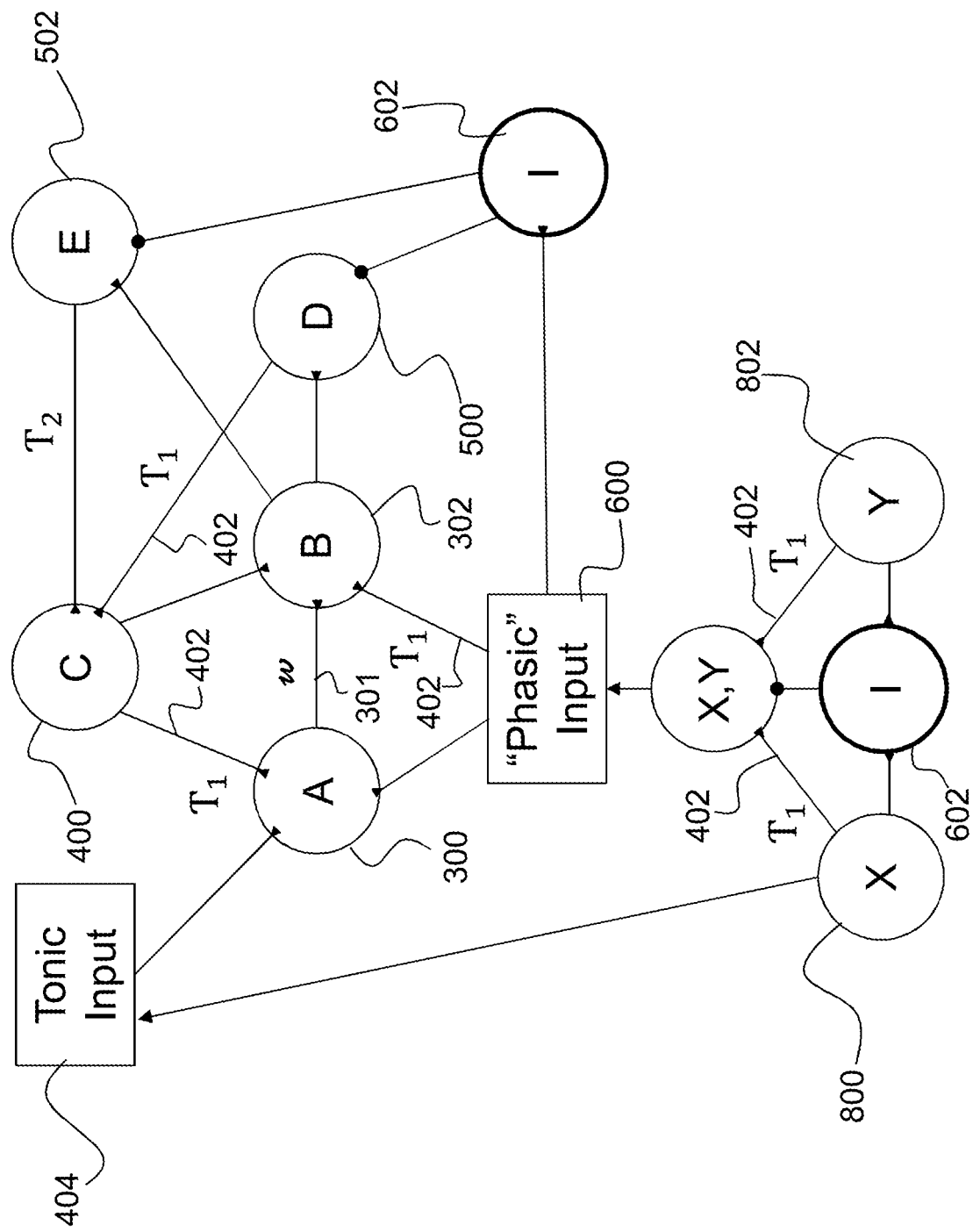
FIG. 8 is an illustration of a full conditional probability unit according to some embodiments of the present disclosure.

Solving the above for w gives the following:

$$w(t) = C_0 \exp^{-I_T t} - \frac{I_P}{I_T}, \qquad (4)$$

where $C_0$ is some constant and t stands for time (thus far referring to instantaneous values for simplicity). This equation can easily be shown to converge to $$\frac{I_P}{I_T}$$

as $t \rightarrow \infty$. In order to compute the conditional probability of two input processes X (element 800) and Y (element 802), define inputs to $I_P$ (i.e., phasic input (element 600)) and $I_T$ (i.e., tonic input (element 404)), as shown in FIG. 8. $I_P$ (element 600) comes from the logical AND of the two input processes X (element 800) and Y (element 802), and $I_T$ (element 404) comes straight from X (element 800). Since the Tonic input (element 404) corresponds to P(X) and the Phasic input (element 600) corresponds to P(X,Y), this equation forces w to converge to P(X,Y)/P(X)=P(YX). In a non-limiting example, data can be obtained from two different sensors (e.g., camera X and camera Y) on an mobile device, such as an autonomous vehicle or robot. The data from each sensor (e.g., image pixels) can be rate-coded and used as inputs X and Y to determine the conditional probability of detecting an object in camera Y given that it is detected in camera X.

(2.5) Experimental Studies

Figure 9:
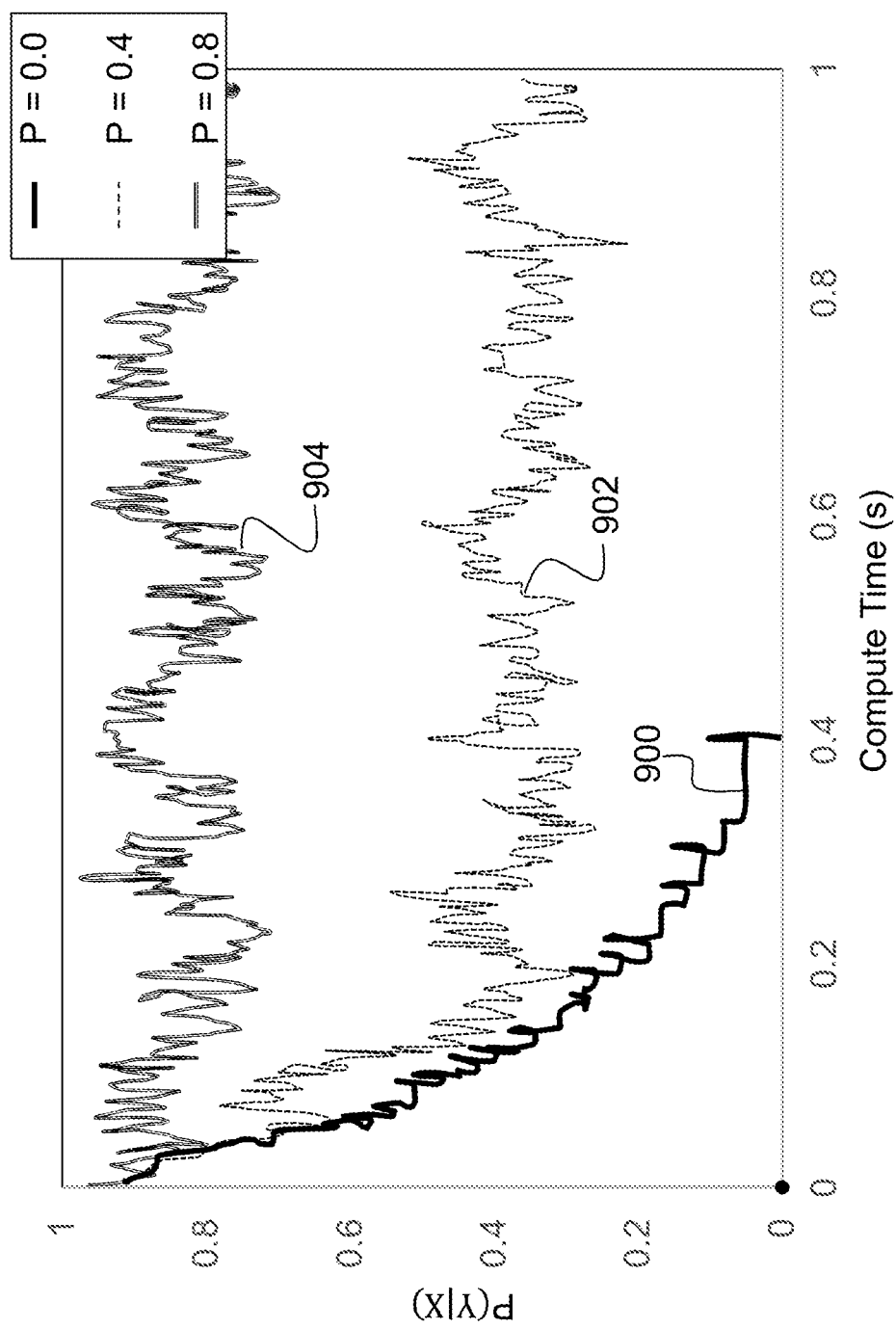
FIG. 9 is an illustration of stabilization of the synaptic weight by inputting Poisson processes according to some embodiments of the present disclosure.

As a simple proof of concept, the following shows that the synaptic weight w in the neuronal network according to embodiments of the present disclosure can model the conditional probability between two input random variables X and Y. Probabilistic input spikes of X are generated as a fixed-rate Poisson process (also referred to as a homogeneous Poisson point process). Each time there is a spike in the realization of X, Y spikes are generated with a fixed Bernoulli probability P. In this experiment, P=0.0, 0.4, 0.8. The results for this experiment are shown in FIG. 9, where the conditional probability is shown to converge correctly to P(Y|X)=0.0, 0.4, 0.8 for the bold (element 900), dashed (element 902), and unbolded (element 904) lines, respectively.

Probabilistic neuronal computation of the type described herein results in lower power and higher speed inferences, making it easily transition to various Size, Weight and Power (SWaP) constrained platforms of interest to vehicle manufacturers and government agencies. Non-limiting examples of these are autonomous systems for ground, aerial, and underwater vehicles and vehicle health diagnostics and prognostics (e.g., sensory and fault modalities, structure learning of maintenance messages). Additionally, adaptive mission planning for autonomous underwater vehicles (AUVs) and unmanned aerial vehicles (UAVs) via scenario and behavior understanding. Further commercial applications include portable medical diagnostics machines.

Complex systems, such as aircrafts or other vehicles, often record maintenance and fault messages from a few thousand different sources, including various sensor types. The occurrence of these messages over time can be treated as a random process corresponding to an input spike train. The neuronal network topology according to embodiments of the present disclosure can be used to determine which of these message sources are highly dependent on which other sources (diagnostics) during Mode 1 ("learning"), and, in turn, be used for prognostics (e.g., if see fault X occur, what is the updated likelihood of seeing fault Y?) during Mode 2 ("readout"). For instance, if a fault is detected in one mechanical vehicle component (e.g., engine, brakes, steering mechanism, tire) that is associated with another mechanical vehicle component (e.g., engine, brakes, steering mechanism, tire), then an alert can be generated for the user. The alert can be an audible alert (e.g., beep, tone, voice) and/or a visual alert displayed on a screen/dashboard of the vehicle. The visual alert can be a signal light or a textual message. Alternatively, the alert can be a warning message or instructions to the vehicle operator (e.g., driver, pilot) indicating a vehicle component malfunction with detailed instructions regarding an operation to perform (e.g., power off the vehicle, perform a steering operation, perform a braking operation, obtain mechanical service). Furthermore, a new conditional probability between a first input data stream from a first vehicle sensor and a third input data stream obtained from a third vehicle sensor can be determined based on the learned conditional probability between a first and second input data stream from first and second vehicle sensors.

In addition, in a non-limiting example of an autonomous vehicle having multiple sensors, such as cameras. Based on the likelihood of one sensor detecting an object and/or obtaining sensor measurement data that is conditional on or related to another sensor detecting an object and/or obtaining a sensor measurement data, the system can cause the autonomous vehicle to perform a vehicle operation. For instance, if two vehicle sensors detect the same object, object detection and classification accuracy is increased and the system described herein can cause a precise vehicle maneuver for collision avoidance by controlling a vehicle component. For example, if the object is a stop sign, the system may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency.

Figure 10:
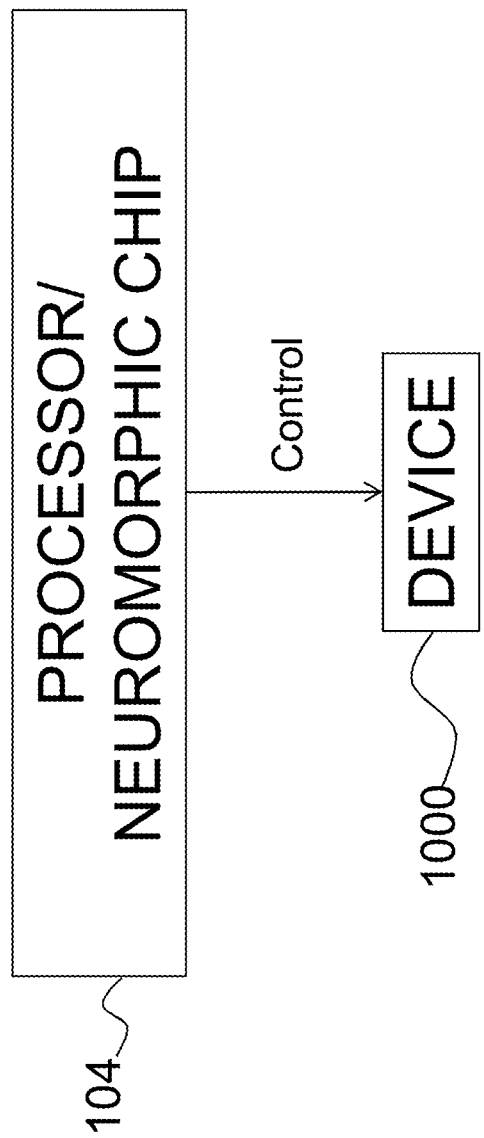
FIG. 10 is an illustration of a device being controlled based on a determined conditional probability according to some embodiments of the present disclosure.

FIG. 10 is a flow diagram illustrating using a processor 104 to control a mobile device 1000 based on the determined conditional probability of two variables. Non-limiting examples of mobile devices 1000 that can be controlled via the processor 104 include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for estimating conditional probabilities for operation of a mobile device, the system comprising:
   one or more processors and a non-transitory computer-readable medium having executable instructions encoded thereon such that when executed, the one or more processors perform operations of:
   inputting a first input data stream obtained from a first mobile device sensor and a second input data stream obtained from a second mobile device sensor into a neuronal network comprising a plurality of neurons, wherein the first and second input data streams are converted into variable spiking rates of a first neuron and a second neuron;
   learning a conditional probability between the first input data stream and the second input data stream, wherein a synaptic weight of interest between the first neuron and the second neuron converges to a fixed-point value corresponding to the conditional probability;
   based on the conditional probability and a new input data stream, estimating a probability of an event; and
   based on the probability of the event, causing the mobile device to perform a mobile device operation.

2. The system as set forth in claim 1, wherein the mobile device operation is a collision avoidance maneuver.

3. The system as set forth in claim 1, wherein the mobile device operation is generation of an alert providing instructions to a mobile device operator.

4. The system as set forth in claim 1, wherein the synaptic weight of interest is updated each time either of the first and second neurons spike according to spike-timing dependent plasticity (STDP), causing a corresponding update in the conditional probability such that the conditional probability is adapted in real-time.

5. The system as set forth in claim 4, wherein all synaptic connections between neurons in the neuronal network have a predetermined delay, and wherein all synaptic weights besides the synaptic weight of interest are fixed at a value such that only the synaptic weight of interest is updated according to STDP.

6. The system as set forth in claim 5, wherein an increment or decrement in the synaptic weight of interest due to spikes in the first neuron causing spikes in the second neuron is set to a constant value that is a multiplier on a change in the synaptic weight of interest.

7. The system as set forth in claim 1, wherein tonic and phasic inputs are used to stabilize the synaptic weight of interest.

8. A computer implemented method for estimating conditional probabilities for operation of a mobile device, the method comprising an act of:
   causing one or more processors to execute instructions encoded on a non-transitory computer-readable medium, such that upon execution, the one or more processors perform operations of:
   inputting a first input data stream obtained from a first mobile device sensor and a second input data stream obtained from a second mobile device sensor into a neuronal network comprising a plurality of neurons, wherein the first and second input data streams are converted into variable spiking rates of a first neuron and a second neuron;
   learning a conditional probability between the first input data stream and the second input data stream, wherein a synaptic weight of interest between the first neuron and the second neuron converges to a fixed-point value corresponding to the conditional probability;
   based on the conditional probability and a new input data stream, estimating a probability of an event; and
   based on the probability of the event, causing the mobile device to perform a mobile device operation.

9. The method as set forth in claim 8, wherein the mobile device operation is a collision avoidance maneuver.

10. The method as set forth in claim 8, wherein the mobile device operation is generation of an alert providing instructions to a mobile device operator.

11. The method as set forth in claim 8, wherein the synaptic weight of interest is updated each time either of the first and second neurons spike according to spike-timing dependent plasticity (STDP), causing a corresponding update in the conditional probability such that the conditional probability is adapted in real-time.

12. The method as set forth in claim 11, wherein all synaptic connections between neurons in the neuronal network have a predetermined delay, and wherein all synaptic weights besides the synaptic weight of interest are fixed at a value such that only the synaptic weight of interest is updated according to STDP.

13. The method as set forth in claim 12, wherein an increment or decrement in the synaptic weight of interest due to spikes in the first neuron causing spikes in the second neuron is set to a constant value that is a multiplier on a change in the synaptic weight of interest.

14. The method as set forth in claim 8, wherein tonic and phasic inputs are used to stabilize the synaptic weight of interest.

15. A computer program product for estimating conditional probabilities for operation of a mobile device, the computer program product comprising:

a non-transitory computer-readable medium having executable instructions encoded thereon, such that upon execution of the instructions by one or more processors, the one or more processors perform operations of:

inputting a first input data stream obtained from a first mobile device sensor and a second input data stream obtained from a second mobile device sensor into a neuronal network comprising a plurality of neurons, wherein the first and second input data streams are converted into variable spiking rates of a first neuron and a second neuron;

learning a conditional probability between the first input data stream and the second input data stream, wherein a synaptic weight of interest between the first neuron and the second neuron converges to a fixed-point value corresponding to the conditional probability;

based on the conditional probability and a new input data stream, estimating a probability of an event; and based on the probability of the event, causing the mobile device to perform a mobile device operation.

16. The computer program product as set forth in claim 15, wherein the synaptic weight of interest is updated each time either of the first and second neurons spike according to spike-timing dependent plasticity (STDP), causing a corresponding update in the conditional probability such that the conditional probability is adapted in real-time.

17. The computer program product as set forth in claim 16, wherein all synaptic connections between neurons in the neuronal network have a predetermined delay, and wherein all synaptic weights besides the synaptic weight of interest are fixed at a value such that only the synaptic weight of interest is updated according to STDP.

18. The computer program product as set forth in claim 17, wherein an increment or decrement in the synaptic weight of interest due to spikes in the first neuron causing spikes in the second neuron is set to a constant value that is a multiplier on a change in the synaptic weight of interest.

19. The computer program product as set forth in claim 15, wherein tonic and phasic inputs are used to stabilize the synaptic weight of interest.

20. A neuromorphic hardware chip for estimating conditional probabilities for a mobile device operation, the neuromorphic hardware chip performing operations of:

inputting a first input data stream obtained from a first mobile device sensor and a second input data stream obtained from a second mobile device sensor into a neuronal network comprising a plurality of neurons, wherein the first and second input data streams are converted into variable spiking rates of a first neuron and a second neuron;

learning a conditional probability between the first input data stream and the second input data stream, wherein a synaptic weight of interest between the first neuron and the second neuron converges to a fixed-point value corresponding to the conditional probability;

based on the conditional probability and a new input data stream, estimating a probability of an event; and based on the probability of the event, causing the mobile device to perform a mobile device operation.

* * * * *